US010166468B2

(12) United States Patent
Yamamura et al.

(10) Patent No.: US 10,166,468 B2
(45) Date of Patent: Jan. 1, 2019

(54) INFORMATION PROCESSING SYSTEM, INFORMATION PROCESSING APPARATUS, RECORDING MEDIUM AND INFORMATION PROCESSING METHOD

(71) Applicant: NINTENDO CO., LTD., Kyoto (JP)

(72) Inventors: Tomohiro Yamamura, Kyoto (JP); Tomomi Sano, Kyoto (JP); Toshiharu Izuno, Kyoto (JP); Hiroyuki Takahashi, Tokyo (JP); Shugo Takahashi, Tokyo (JP); Yusuke Sugimoto, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 469 days.

(21) Appl. No.: 14/870,454

(22) Filed: Sep. 30, 2015

(65) Prior Publication Data
US 2016/0101354 A1 Apr. 14, 2016

(30) Foreign Application Priority Data

Oct. 10, 2014 (JP) ................. 2014-209055

(51) Int. Cl.
*A63F 9/24* (2006.01)
*A63F 13/35* (2014.01)
(Continued)

(52) U.S. Cl.
CPC .............. *A63F 13/35* (2014.09); *A63F 13/31* (2014.09); *A63F 13/79* (2014.09); *A63F 13/795* (2014.09); *A63F 13/798* (2014.09)

(58) Field of Classification Search
USPC .................................................... 463/16–42
See application file for complete search history.

(56) References Cited

U.S. PATENT DOCUMENTS 8,360,873 B1* 1/2013 Wickett .............. G07F 17/3267
463/13
9,317,991 B2* 4/2016 Macbeth ............. G07F 17/3286
(Continued)

FOREIGN PATENT DOCUMENTS

JP 2002-346205 A 12/2002
JP 2006-43099 A 2/2006
(Continued)

OTHER PUBLICATIONS

Notification of Reasons for Refusal dated Sep. 5, 2018, issued in corresponding Japanese Patent Application No. 2014-209055 and English machine translation, 7 pages.
(Continued)

Primary Examiner — Masud Ahmed
(74) Attorney, Agent, or Firm — Nixon & Vanderhye P.C.

(57) ABSTRACT

An example system includes a server and multiple information processing apparatuses. The server includes a competition request acceptance unit accepting a competition request from the information processing apparatus, and an opponent decision unit deciding an opponent of a user concerning the request accepted by the competition request acceptance unit. The information processing system includes a history storage unit storing competition history information for a user in a tournament, an exchange processing unit performing processing of exchanging at least a part of the competition history information between competing users, based on the decision made by the opponent decision unit, and a competition processing unit performing processing concerning a competition between the users. The opponent decision unit decides an opponent based on at least a part of competition history information stored in the history storage unit.

23 Claims, 11 Drawing Sheets

(51) Int. Cl.
*A63F 13/795* (2014.01)
*A63F 13/798* (2014.01)
*A63F 13/31* (2014.01)
*A63F 13/79* (2014.01)

(56) References Cited

U.S. PATENT DOCUMENTS

| | | |
|---|---|---|
| 2002/0183116 A1 | 12/2002 | Takahashi et al. |
| 2006/0281555 A1* | 12/2006 | Kellerman .............. G07F 17/32 463/42 |
| 2007/0117619 A1* | 5/2007 | Walker .................... G07F 17/32 463/29 |
| 2007/0191101 A1* | 8/2007 | Coliz ...................... A63F 13/12 463/42 |
| 2008/0032759 A1 | 2/2008 | Takahashi |
| 2013/0053149 A1* | 2/2013 | Rouse .................... H04W 4/02 463/42 |
| 2014/0057705 A1* | 2/2014 | Elias ................... G07F 17/3244 463/25 |
| 2014/0274258 A1* | 9/2014 | Hartmann ........... G07F 17/3227 463/13 |
| 2014/0274280 A1* | 9/2014 | MacBeth .............. G07F 17/329 463/19 |
| 2015/0126274 A1* | 5/2015 | Newton ............ G07F 17/3244 463/25 |
| 2015/0258446 A1* | 9/2015 | Billings ............ G07F 17/3272 463/42 |

FOREIGN PATENT DOCUMENTS

| | | |
|---|---|---|
| JP | 2009-005790 | 1/2009 |
| JP | 2014-209055 A | 10/2010 |

OTHER PUBLICATIONS

Suzuki, Tomomichi, "Evaluating Tournament Systems," IPSJ SIG Technical Report, 2007, pp. 41-47.

* cited by examiner

F I G. 7
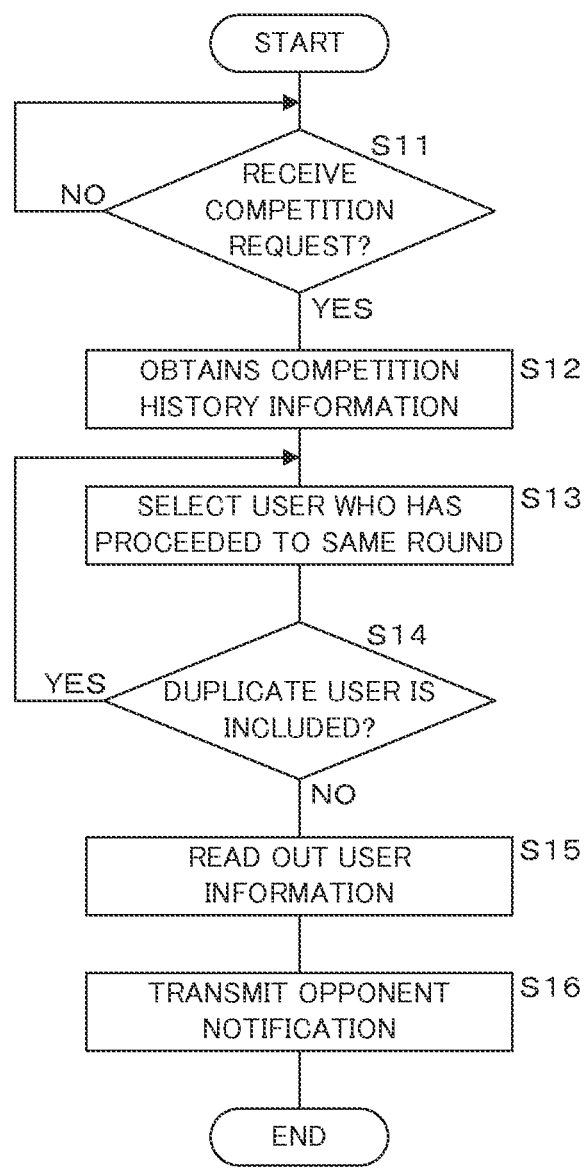

INFORMATION PROCESSING SYSTEM, INFORMATION PROCESSING APPARATUS, RECORDING MEDIUM AND INFORMATION PROCESSING METHOD

CROSS-REFERENCE TO RELATED APPLICATIONS

This application is based upon and claims the benefit of priority of the prior Japanese Patent Application No. 2014-209055, filed on Oct. 10, 2014, the entire contents of which are incorporated herein by reference.

FIELD

The present technology herein relates to an information processing system, an information processing apparatus, a recording medium and an information processing method for multiple users to compete in a tournament via a network.

BACKGROUND AND SUMMARY

In recent years, games in which multiple users may participate via a network such as the Internet, i.e. on-line games, have widely been spread. In such an on-line game, multiple users access a network using information processing apparatuses respectively, which allows the users at distant locations or unacquainted users to play the same game and enjoy playing games by competing, cooperating or the like.

According to an aspect of the embodiment, in an information processing system, a server communicates with multiple information processing apparatuses via a network, and users of the information processing apparatuses compete in a tournament. The server comprises: a competition request acceptance unit accepting a competition request from the information processing apparatus; and an opponent decision unit deciding an opponent of a user concerning a request accepted by the competition request acceptance unit. The information processing system comprises: a history storage unit storing competition history information for a user in a tournament; an exchange processing unit performing processing of exchanging at least a part of the competition history information between competing users, based on a decision made by the opponent decision unit; and a competition processing unit performing processing concerning a competition between the users. The opponent decision unit decides an opponent based on at least a part of competition history information stored in the history storage unit.

The object and advantages of the present technology herein will be realized and attained by means of the elements and combinations particularly pointed out in the claims. It is to be understood that both the foregoing general description and the following detailed description are exemplary and explanatory and are not restrictive of the technology herein.

The above and further objects and features of the present technology herein will more fully be apparent from the following detailed description with reference to the accompanying drawings.

BRIEF DESCRIPTION OF THE DRAWINGS

FIG. 7 shows an example non-limiting flowchart illustrating processing for deciding an opponent by a server;

DETAILED DESCRIPTION OF NON-LIMITING EXAMPLE EMBODIMENTS

<Outline>

Figure 1:
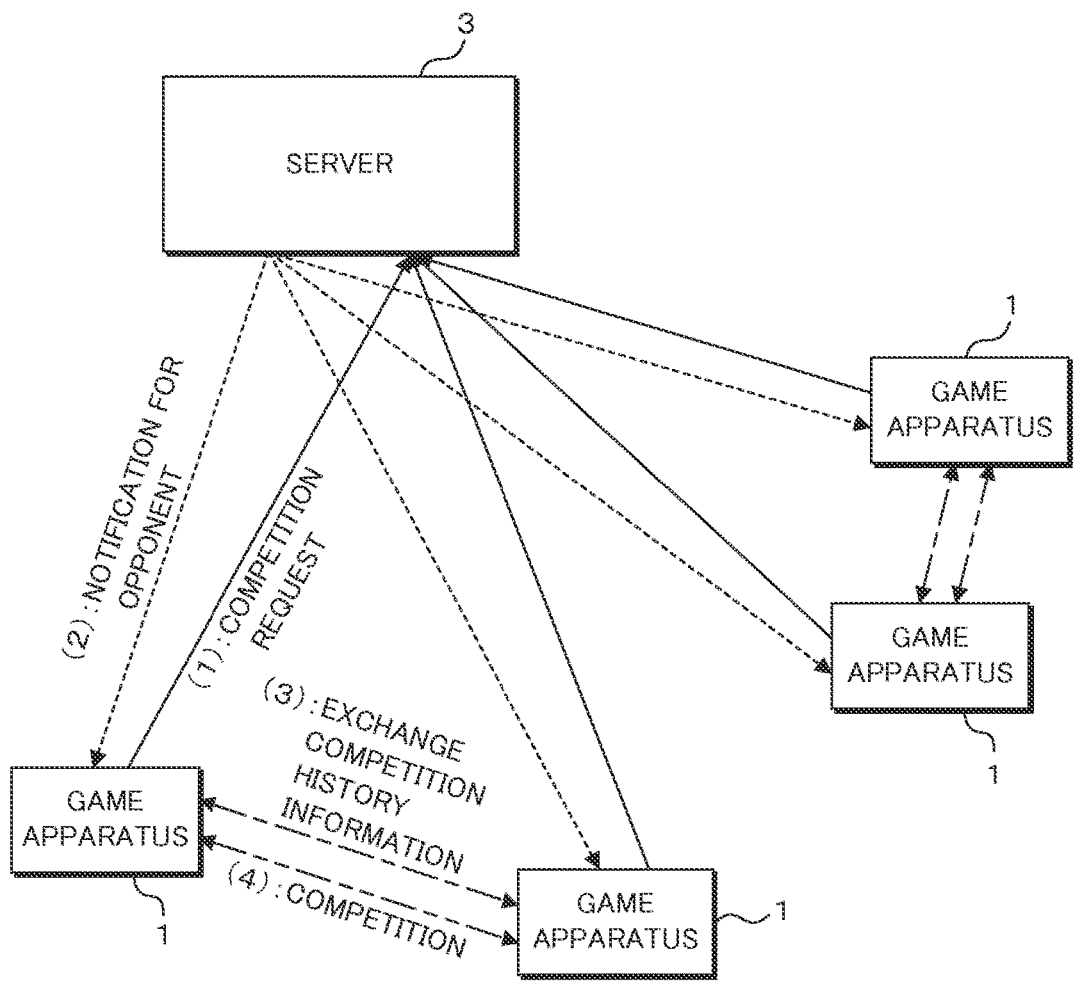
FIG. 1 shows an example non-limiting schematic view illustrating an outline of an information processing system according to a present example embodiment.

FIG. 1 shows an example non-limiting schematic view illustrating the outline of an information processing system according to the present example embodiment. In the information processing system according to the present example embodiment, multiple game apparatuses 1 communicate with one server 3 via a network to realize an on-line game in which users compete in a tournament. In the present example embodiment, it is assumed that one user plays a game using one game apparatus 1. It is, however, possible for multiple users to share one game apparatus 1. It is assumed that the game in the present example embodiment is for two users to compete against each other on a one-to-one basis such as tennis or boxing, for example. It is, however, possible to employ a game for a competition on a multiple-to-multiple basis.

A user who wishes to play in a tournament accesses the server 3 by the game apparatus 1 via a network. The user selects an item for a tournament competition from a menu screen or the like displayed after login, for example. This transmits a competition request from the game apparatus 1 to the server 3 (see solid arrow (1)). The server 3 which received the competition request from the game apparatus 1 selects an opponent of the user concerning the competition request from other users who have already made competition requests which are accepted. Here, the server 3 selects users who have proceeded to the same round in a tournament as opponents. In the case where a user to be selected as an opponent is absent, the server 3 may transmit a message or the like for asking the user to wait, to the game apparatus 1. The case where a user to be selected as an opponent is absent corresponds to, for example, a case where no other user who has made an accepted competition request is present. The server 3 notifies two users who are going to compete as a result of the selection, of their opponents, through the respective game apparatuses 1 used by these users (see broken arrows (2)).

The game apparatus 1 which received the notification for an opponent from the server 3 performs direct communication, i.e. P2P (pier-to-pier) communication, with the game apparatus 1 used by the user who is designated as the opponent. Each game apparatus 1 in the present example embodiment stores therein the history of past competition matches in a tournament for its user, as competition history information. In the direct communication between two game apparatuses 1, the competition history information stored in the respective game apparatuses 1 are exchanged (see dashed-dotted arrows (3)). Thereafter, the users compete against each other in a game using the two game apparatuses 1 (see dashed-two dotted arrows (4)). After the competition is finished, each game apparatus 1 updates the competition history information stored in accordance with the result of a competition and also notifies the server 3 of the competition result (not illustrated). In the present example embodiment, it is so configured that the competition history information are exchanged and a competition in a game is performed through direct communication between the two game apparatuses 1. It is, however, also possible to perform processing such as exchanging competition history information and competing in a game, by the two game apparatuses 1 communicating through the server 3.

In the information processing system according to the present example embodiment, the competition request from the game apparatus 1 to the server 3 is made for each round in a tournament, not only once for the entire tournament. That is, in the case where three rounds, i.e. first, second and final rounds, are carried out in a tournament with eight users, first, a user transmits a competition request for the first round using the game apparatus 1 to the server 3. In response to the competition request, the server 3 selects users who have made competition requests for the first round as opponents. As a result of the competition, the user who won the first round obtains the right to compete in the second round.

In the case where the user who won the first round makes a competition request to the server 3 using the game apparatus 1, the server 3 selects the users who won the first rounds as opponents to realize the second round match. The competition history information stored in each game apparatus 1 includes information which may be used to determine how many rounds in the tournament the user has won. When transmitting a competition request to the server 3, the game apparatus 1 transmits the information which may be used to determine how many rounds the user has won, among the stored competition history information, together with at least the competition request. This allows the server 3 to determine how many rounds the user who made the competition request has won and thereby to realize a competition by the users in the same round. Accordingly, the second and final rounds are realized, and the user who wins the final round becomes the champion of the tournament.

The information processing system according to the present example embodiment is so configured as to make a competition request for each round in a tournament. This configuration eliminates the need for the user to continuously play from the first to final rounds in the tournament. Thus, the user may take appropriate time off between rounds, i.e. may play each round every other day for example, thereby eliminating the need for the user to secure a stretch of time to participate in a tournament. Even in the case where the user continuously plays from the first to final rounds, the server 3 may select an opponent from multiple users every time a competition request is made. This allows the user to continuously compete without waiting for other rounds in the tournament to be finished.

Figure 2:
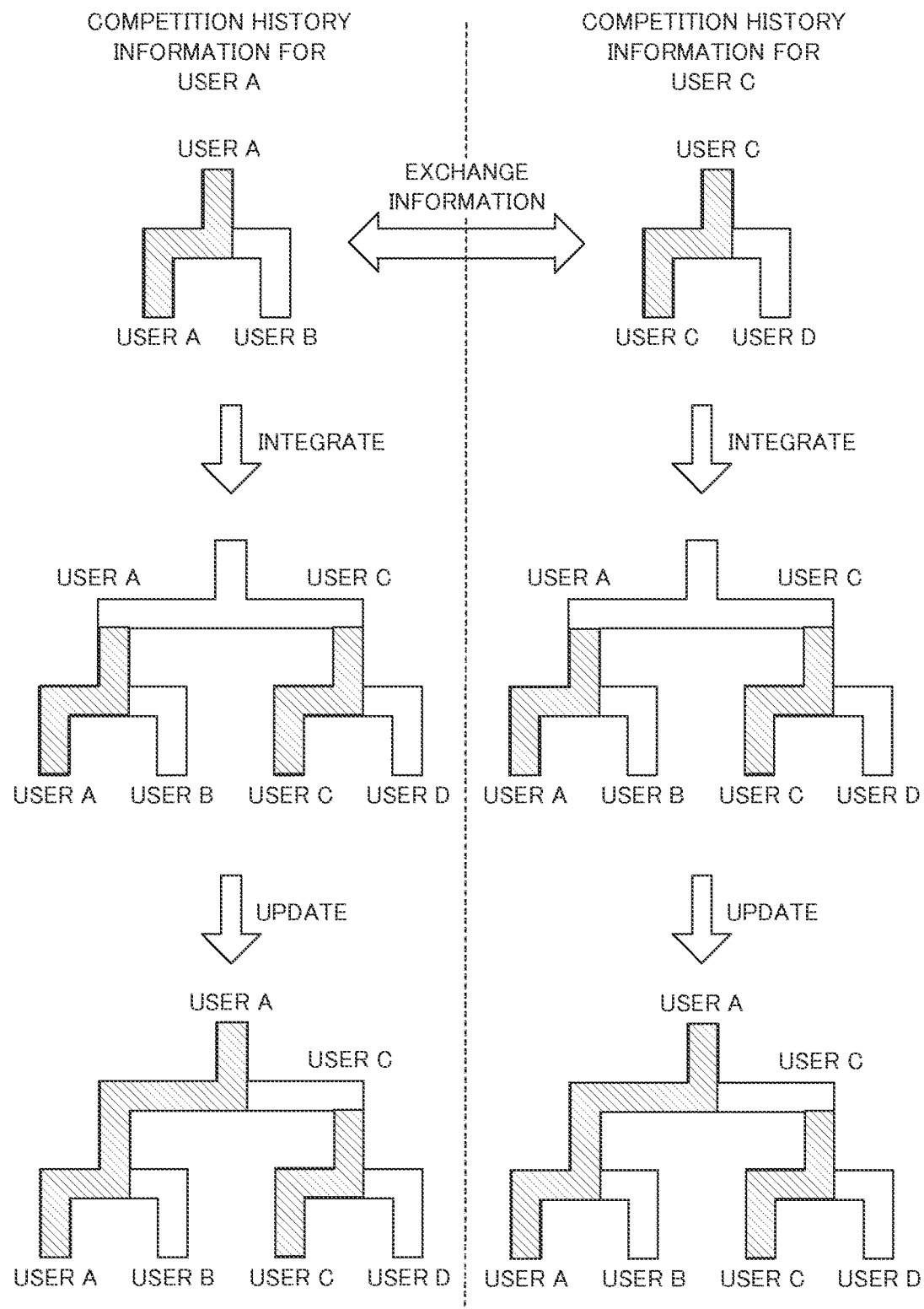
FIG. 2 shows an example non-limiting schematic view illustrating competition history information.

FIG. 2 shows an example non-limiting schematic view illustrating competition history information. In the present example, a user A competes against a user B in the first round in a tournament, and the user A wins. Here, the competition history information for the user A stored in the game apparatus 1 used by the user A represents the information indicating that the user A competed against user B in the first round and won, as illustrated at the top on the left side in FIG. 2. The same information is included in the competition history information for the user B. It is to be noted that the competition history information for the user A represents the information indicating that the user A won the first round, whereas the competition history information for the user B represents the information indicating that the user B lost the first round. In the present example, a user C competes against a user D in the first round in the tournament, and the user C wins. Here, the competition history information for the user C stored in the game apparatus 1 used by the user C represents the information indicating that the user C competed against user D in the first round and won, as illustrated at the top on the right side in FIG. 2.

Assume here that the users A and C use the respective game apparatuses 1 to send competition requests for the tournament to the server 3. In response to the requests, assume that the server 3 selects, as opponents, the users A and C who have won the first rounds and proceeded to the second round. The server 3 notifies the game apparatus 1 of the user A that the user C is the opponent. The server 3 notifies the game apparatus 1 of the user C that the user A is the opponent. The notification for an opponent from the server 3 to the game apparatus 1 includes information necessary to communicate with the game apparatus 1 used by the opponent user, e.g., information such as an address.

The game apparatus 1 which is notified of an opponent from the server 3 directly communicates with the game apparatus 1 used by the opponent user, to exchange the competition history information stored in the respective game apparatuses 1. That is, the game apparatus 1 of the user A transmits the competition history information for the user A to the game apparatus 1 of the user C, while receiving the competition history information for the user C from the game apparatus 1 of the user C. Likewise, the game apparatus 1 of the user C transmits the competition history information for the user C to the game apparatus 1 of the user A, while receiving the competition history information for the user A from the game apparatus 1 of the user A. This allows the both game apparatuses 1 to hold the competition history information for the user A and the competition history information for the user C.

The game apparatus 1 which exchanged the competition history information performs processing of integrating the competition history information stored in itself with the competition history information obtained by the exchange. As illustrated in the middle on the right and left sides in FIG. 2, by each game apparatus 1 integrating the competition history information, the competition history information for the user A will have the content similar to the competition history information for the user C. The competition history information integrated in the present example represents the information indicating that the user A who won the first round match against the user B now competes against the user C who won the first round match against the user D in the second round.

Thereafter, the game apparatus 1 of the user A directly communicates with the game apparatus 1 of the user C to perform processing concerning the competition of the game. If win or loss of the competition is confirmed, each game apparatus 1 updates the competition history information by reflecting the competition result of the game to the competition history information. In the present example, the competition history information in the case where the user A wins is shown at the bottom on the right and left sides in FIG. 2. While the competition history information for the user A has the content similar to the competition history information for the user C, the competition history information for the user A will be the information indicating that the user A won the second round whereas the competition history information for the user C will be the information indicating that the user C lost the second round.

The game apparatus 1 of the user A who won a competition stores therein the updated competition history information. In the next competition, the game apparatus 1 exchanges this competition history information with the game apparatus 1 used by an opponent in the third round. On the contrary, the game apparatus 1 of the user C who lost the competition does not necessarily need to store the updated competition history information. In the case where, for example, the user C who lost the competition plays again from the first round in the tournament, the game apparatus 1 may discard the previous competition history information and generate new competition history information. If, for example, the user C is able to play again from the lost round (the second round in the present example), the game apparatus 1 may discard only the competition history information related to the user A who is the opponent in the lost round, and return the information to the state before the competition against the user A (i.e. the state indicated at the top on the right side in FIG. 2) to store this competition history information therein.

Thus, in the information processing system according to the present example embodiment, the competition history information for each user in a tournament is not only the information representing how many rounds the user have won. The competition history information includes information related to an opponent user who have previously competed against the user of interest and also information related to another user who had previously competed against the opponent user (a user who have never competed against the user of interest). Therefore, in the information processing system according to the present example embodiment, despite the fact that each game apparatus 1 individually manages the competition history information, the entire tournament table as illustrated at the bottom in FIG. 2 may be displayed for allowing the user to view it.

<System Configuration>

Figure 3:
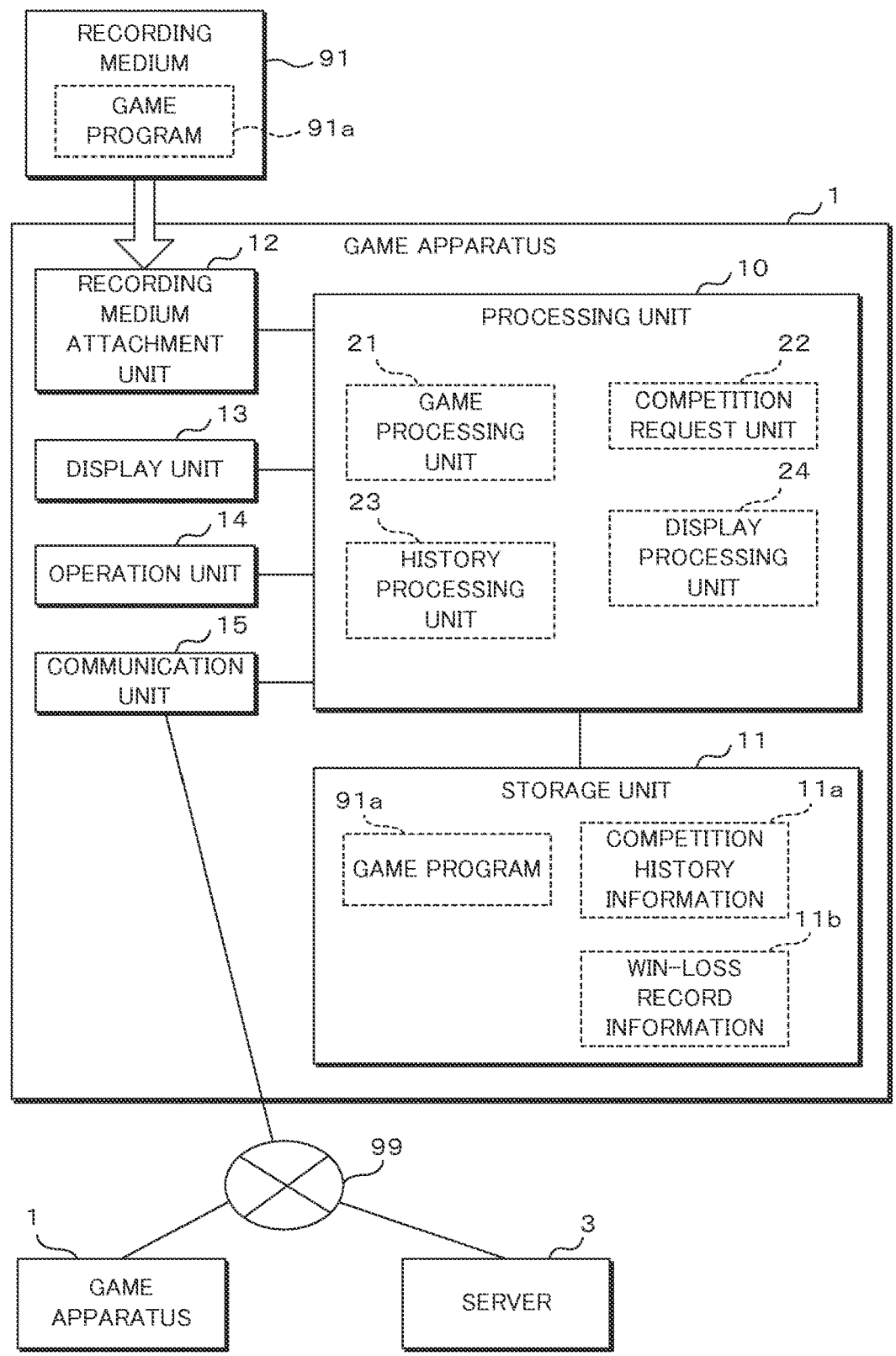
FIG. 3 shows an example non-limiting block diagram illustrating a configuration of a game apparatus according to the present example embodiment.

FIG. 3 shows an example non-limiting block diagram illustrating a configuration of the game apparatus 1 according to the present example embodiment. The game apparatus 1 according to the present example embodiment includes a processing unit (processor) 10, a storage unit 11, a recording medium attachment unit 12, a display unit 13, an operation unit 14, a communication unit 15 and so forth. The processing unit 10 in the game apparatus 1 is constituted by an arithmetic processing device such as a CPU (Central Processing Unit). The processing unit 10 reads out and executes a game program 91a recorded in a recording medium 91 attached to the recording medium attachment unit 12 or a game program 91a stored in the storage unit 11, to perform various kinds of information processing concerning on-line games.

The storage unit 11 is constituted by a semiconductor memory device, a hard disk drive or the like. The storage unit 11 stores therein various programs such as the game program 91a and data necessary for executing the program. The storage unit 11 stores therein, as information related to a tournament match in an on-line game by the user of the game apparatus 1, competition history information 11a and win-loss record information 11b. As described above, the competition history information 11a contains, for example, information on how many rounds the user have won in the tournament of the on-line game and information related to users constituting the tournament, including past opponents. The win-loss record information 11b contains, for example, information on the user's performance in the on-line game competition, such as the winning rate of the competition, the number of times the user won the first round, the number of times the user won the second round, the number of times the user won the championship, or the number of times the user lost the first round.

While the present example embodiment describes the competition history information 11a and the win-loss record information 11b individually, these information may be treated as one piece of information. Furthermore, these information may be divided into three or more pieces. The information indicating how many rounds the user have won in the tournament competition may be referred to as a name other than the competition history information described above, for example, progress status information or win-out number information. The information related to the users constituting the tournament including past opponents may be referred to as another name such as opponent information or tournament constitution information.

The recording medium attachment unit 12 is so configured that the recording medium 91 of a card type, cassette type or disk type may be attached thereto and detached therefrom. The processing unit 10 may read out the game program 91a and various kinds of data from the recording medium 91 attached to the recording medium attachment unit 12. Such a configuration is also possible that the processing unit 10 may write a program, data or the like into the recording medium 91.

The display unit 13 is constituted by a liquid-crystal panel and displays an image received from the processing unit 10. The operation unit 14 is, for example, a button of a press-down type or a touch panel installed on a display unit 13. The operation unit 14 supplies a signal in accordance with the content of operation performed by the user to the processing unit 10. The content of operation is, for example, pressing down or releasing of a button. The communication unit 15 transmits and receives information to/from another game apparatus 1, server 3 or the like via a network 99 such as, for example, the Internet. For example, the game apparatus 1 may communicate with the server 3 through the communication unit 15 to download the game program 91a or the like, and store it in the storage unit 11.

In the game apparatus 1 according to the present example embodiment, by the processing unit 10 executing the game program 91a, a game processing unit 21, a competition request unit 22, a history processing unit 23, a display processing unit 24 and the like may be implemented by the processing unit 10 as software functional blocks. The game processing unit 21 performs various kinds of determination processing, event processing or the like related to a game, in accordance with the operation of the user accepted at the operation unit 14.

The competition request unit 22 makes a request for a tournament competition in an on-line game to the server 3 via the network 99. The competition request unit 22 transmits information necessary for the server 3 to decide an opponent to the server 3 together with the competition request. The information necessary for deciding an opponent is, for example, the competition history information 11a or a part thereof. The competition request unit 22 receives notification for an opponent transmitted from the server 3 in response to the competition request.

The history processing unit 23 performs processing of exchanging competition history information 11a with the game apparatus 1 used by the opponent user. The history processing unit 23 performs processing of integrating the competition history information 11a for its own user stored in the storage unit 11 of its own apparatus with the competition history information 11a for the opponent user obtained by the exchange. The history processing unit 23 performs processing of updating the competition history information 11a in accordance with the competition result of an on-line game.

The display processing unit 24 performs processing of generating a game screen in accordance with the processing result of the game processing unit 21 and sending it to the display unit 13, to display the game screen on the display unit 13. The display processing unit 22 performs processing of displaying a tournament table for a tournament in which the user participates, based on the competition history information 11a stored in the storage unit 11.

Figure 4:
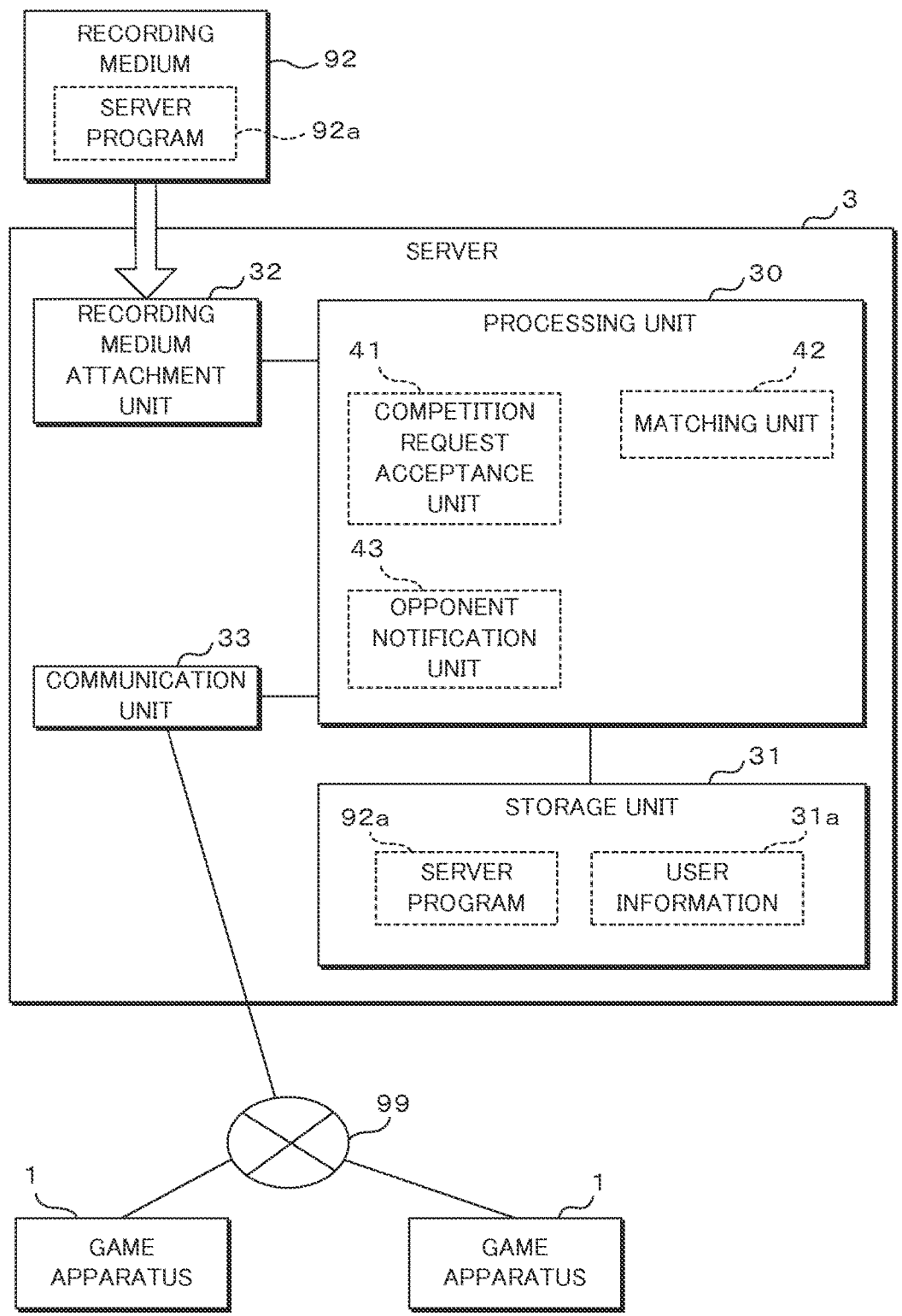
FIG. 4 shows an example non-limiting block diagram illustrating a configuration of a server according to the present example embodiment.

FIG. 4 shows an example non-limiting block diagram illustrating a configuration of the server 3 according to the present example embodiment. The server 3 according to the present example embodiment includes a processing unit (processor) 30, a storage unit 31, a recording medium attachment unit 32, a communication unit 33 and so forth. The processing unit 30 is constituted by an arithmetic processing device such as a CPU. The processing unit 30 reads out and executes a server program 92a stored in the storage unit 31, to perform various kinds of processing concerning an on-line game. The storage unit 31 is constituted by a non-volatile storage device, which may store a program such as the server program 92a and various kinds of data. In the present example embodiment, the storage unit 31 stores information related to the user who participates in an on-line game as user information 31a. The user information 31a may include, for example, identification information of a user, a password and identification information of the game apparatus 1 being used. The user information 31a may further include information such as the user's performance in a tournament.

The recording medium attachment unit 32 is so configured that a recording medium 92 having a disk shape or the like is attached thereto or detached therefrom. The processing unit 30 may read out the server program 92a from the recording medium 92 attached to the recording medium attachment unit 32 as well as other various kinds of data, and install them in the storage unit 31. The communication unit 33 transmits and receives data to/from one or more game apparatuses 1 via the network 99 such as the Internet.

In the server 3 according to the present example embodiment, the processing unit 30 executes the server program 92a so that a competition request acceptance unit 41, a matching unit 42, an opponent notification unit 43 and the like are implemented as software functional blocks. The competition request acceptance unit 41 performs processing of accepting a competition request for a tournament in an on-line game from the game apparatus 1. The matching unit 42 performs matching processing of deciding an opponent in response to the competition request accepted by the competition request acceptance unit 41. The opponent notification unit 43 performs processing of notifying the game apparatus 1, used by an opponent user, of an opponent based on the result of the matching processing performed by the matching unit 42.

<Tournament Competition Processing>

Next, an example of an on-line game implemented by the information processing system according to the present example embodiment will be described. The content of the game which will be described is, however, a mere example, and the present technology may also be applied to various games other than the one described. The on-line game according to the present example embodiment is a game in which characters operated by users compete against one another in a tennis tournament in a virtual space. The tournament decides one champion out of eight users through the first, second and final rounds.

A user may start the game apparatus 1 and execute the game program 91a from a home screen or the like, to play the on-line game according to the present example embodiment. By executing the game program 91a, the processing unit 10 of the game apparatus 1 may display a menu screen or the like related to the game on the display unit 13, and perform processing such as acceptance of selection for a menu item by the user. The menu screen may include, in addition to the menu items for the user to participate in an on-line tournament, menu items such as a single play in which the user plays a tennis game alone without communication, viewing of past competition results, replay of past competitions, or various types of environment settings, for example.

In the case where the menu item for participating in an on-line tournament is selected, the game processing unit 21 of the processing unit 10 communicates with the server 3 through the communication unit 15, and performs login processing as necessary. After necessary processing is finished, the game processing unit 21 performs processing of obtaining information from the server 3 and displaying a list of tournaments being held, for example. The game processing unit 21 accepts a selection of a tournament to be participated in from the displayed list of tournaments through the user's operation for the operation unit 14. If the tournament to be participated in is selected, the display processing unit 24 of the processing unit 10 reads out the competition history information 11a stored in the storage unit 11 and displays the progress status related to the tournament on the display unit 13 as a tournament table.

Figure 5:
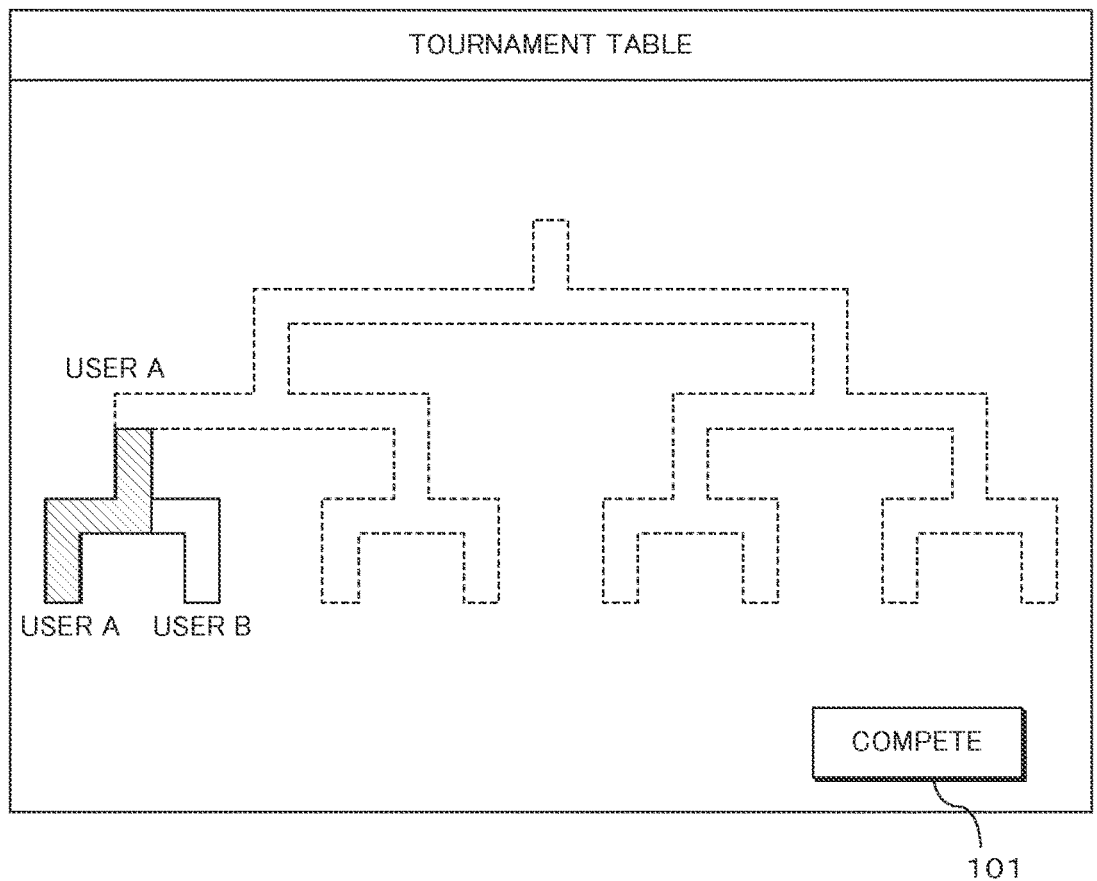
FIG. 5 shows an example non-limiting schematic view illustrating a display example of a tournament table for a tournament played by a game apparatus.

FIG. 5 shows an example non-limiting schematic view illustrating a display example of a tournament table for a tournament played by the game apparatus 1. In the present example, the user of the game apparatus 1 is called a user A, who competed against a user B in the first round in the present tournament and won. The competition history information 11a in this case contains such information, for example, that the participants of the tournament are the user A and user B, and that the user A competed against the user B in the first round and the user A won. If, for example, the user A participates in the first round of the tournament for the first time, either the competition history information 11a is not stored in the storage unit 11, or the competition history information 11a contains information indicating that the participant of the tournament is the user A and that the first round has not yet been played.

The display processing unit 24 in the game apparatus 1 generates and displays a tournament table from information contained in the competition history information 11a in such a manner that a confirmed part and an unconfirmed part in the tournament are distinguishable from one another. In the illustrated example, since the fact that the user A and user B competed in the first round in which the user A won is confirmed, the display processing unit 24 displays the part corresponding to this fact with solid lines in the tournament table. On the other hand, since the remaining six users as well as the other results in the first round in the tournament, for example, are not confirmed, the display processing unit 24 displays these parts with broken lines.

A compete button 101 is shown on the display screen of the tournament table displayed by the display processing unit 24. The user of the game apparatus 1 may perform operation for the compete button 101 using the operation part 14, to make a request for a competition in the tournament to the server 3. In the present example, the user may request the competition in the second round. If the operation for the compete button 101 is accepted, the competition request unit 22 of the game apparatus 1 transmits a competition request related to the tournament to the server 3. Here, the competition request unit 22 transmits the competition history information 1a stored in the storage unit 11 to the server 3, together with other information such as identification information for the user A and the identification information for the tournament in which the user is participated. Though, in the present example embodiment, the competition request unit 22 transmits all the competition history information 11a to the server 3, it is also possible to extract necessary information from the competition history information 11a and transmit it to the server 3.

Figure 6:
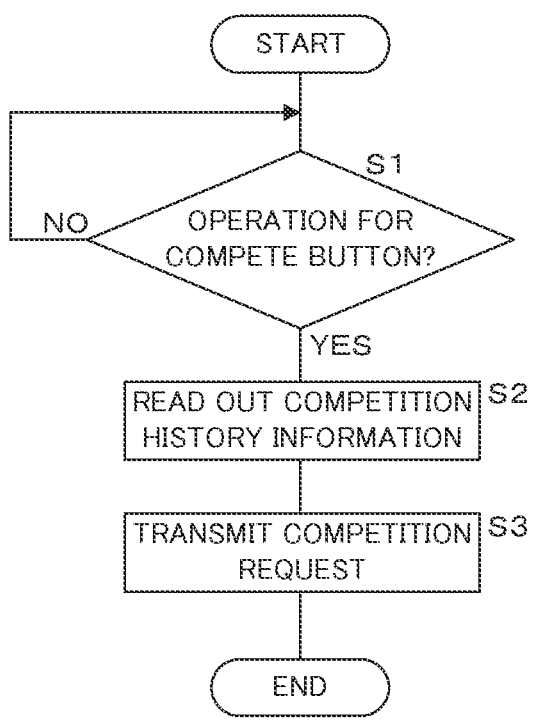
FIG. 6 shows an example non-limiting flowchart illustrating a procedure of competition requesting processing performed by a game apparatus.

FIG. 6 shows an example non-limiting flowchart illustrating a procedure of competition requesting processing performed by the game apparatus 1. In the state where a tournament table is displayed by the display processing unit 24, the processing unit 10 in the game apparatus 1 determines whether or not operation is performed for the compete button 101 (step S1). If the operation is not performed for the compete button 101 (S1: NO), the processing unit 10 waits until the operation is performed for the compete button 101. If the operation is performed for the compete button 101 (S1: YES), the competition request unit 22 of the processing unit 10 reads out competition history information 11a stored in the storage unit 11 (step S2). The competition request unit 22 transmits a competition request including the read-out competition history information 11a (step S3), and terminates the processing.

The competition request transmitted from the game apparatus 1 is accepted by the competition request acceptance unit 41 in the server 3. The competition request acceptance unit 41 sends the competition history information 11a included in the accepted competition request to the matching unit 42. The matching unit 42 performs processing of selecting two users as opponents from multiple users for which competition requests are accepted. Here, the matching unit 42 selects another user who proceeded to the same round in the tournament as an opponent based on the competition history information 11a for the user. In the present example, the matching unit 42 selects, as an opponent for the user A who has proceeded to the second round in the tournament, a user C who has likewise proceeded to the second round (see FIG. 2), based on the competition history information 11a for the user A.

Furthermore, the matching unit 42 compares the competition history information 11a for the selected two users, and determines whether or not there is a duplicate user included in the both competition history information 11a. In the case where at least one user is duplicated in the both competition history information 11a, the matching unit 42 changes the opponent to another user. If there is no duplicate user in the both competition history information 11a, the matching unit 42 decides the selected two users as opponents.

The matching unit 42 decides an opponent so that a user who is participating in the current tournament will not compete in overlapped matches. That is, in the case where all of the tournament table is confirmed in the current tournament, the matching unit 42 decides an opponent so as to avoid a case where the same user participates in the first rounds at more than one places in the tournament table.

In the present example, the matching unit 42 compares the user A and user B included in the competition history information 11a for the user A with the user C and user D included in the competition history information 11a for the user C, and decides an opponent since no duplicate user is present.

If selection of an opponent by the matching unit 42 is confirmed, the opponent notification unit 43 in the server 3 transmits an opponent decision notification to the game apparatus 1 utilized by two users who are to compete against each other. Here, the opponent notification unit 43 transmits, to each user, information necessary for communicating with the game apparatus 1 of the user who is to be an opponent, e.g., the address or identification information of the game apparatus 1. It is to be noted that the opponent notification unit 43 may obtain these information from the user information 31a in the storage unit 31. In the present example, the server 3 transmits, to the user A, that the opponent is the user C as well as information necessary for communicating with the game apparatus 1 used by the user C, as an opponent decision notification. The server 3 transmits, to the user C, the fact that the opponent is the user A as well as information necessary for communicating with the game apparatus 1 used by the user A, as an opponent decision notification.

FIG. 7 shows an example non-limiting flowchart illustrating processing for deciding an opponent by the server 3. The competition request acceptance unit 41 of the processing unit 30 in the server 3 determines whether or not a competition request from the game apparatus 1 is received (step S11). If a competition request is not received (S11: NO), the competition request acceptance unit 41 waits until a competition request is received. If a competition request is received (S11: YES), the competition request acceptance unit 41 obtains competition history information 11a included in the received competition request (step S12).

The matching unit 42 in the processing unit 10 selects a user who has proceeded to the same round as the user of interest, as an opponent, based on the competition history information 11a obtained by the competition request acceptance unit 41 (step S13). The matching unit 42 compares the competition history information 11a for two users who are to be opponents, and determines whether or not a duplicate user is included in the both competition history information 11a (step S14). If there is a duplicate (S14: YES), the matching unit 42 returns the processing to step S13, and selects another user as an opponent. If there is no duplicate (S14: NO), the matching unit 42 decides an opponent.

The opponent notification unit 43 in the processing unit 10 reads out user information 31a stored in the storage unit 31 for two users who are decided to compete (step S15). Based on the read-out user information 31a, the opponent notification unit 43 generates an opponent notification including, for example, information necessary for communicating with the game apparatus 1 used by an opponent user. The opponent notification unit 43 transmits the generated opponent notification to the game apparatus 1 of each user (step S16), and terminates the processing.

The opponent notification transmitted by the server 3 is received by the game apparatus 1. The history processing unit 23 in the game apparatus 1 which received the opponent notification exchanges competition history information 11a with the opponent of notification. The history processing unit 23 communicates with the game apparatus 1 used by the opponent of notification, based on the information included in the received opponent notification. Here, the history processing unit 23 transmits the competition history information 11a for its user stored in the storage unit 11 to the game apparatus 1 of the opponent, while receiving competition history information 11a for the opponent transmitted from the game apparatus 1 of the opponent.

After the exchange of competition history information 11a is finished, the history processing unit 23 performs processing of integrating the competition history information 11a for its own user with the competition history information 11a for the opponent. The integration of competition history information 11a is as illustrated in FIG. 2. In the present example, new competition history information 11a obtained by integrating the competition history information 11 for the user A with the competition history information 11a for the user C is to contain the following matters.

The participants of the tournament are the four users A to D.

The user A and user B competed in the first round and the user A won.

The user C and user D competed in the first round and the user C won.

The user A and user C will compete in the second round.

In the integration, the competition history information 11a for the user A and the competition history information 11a for the user C will have the same content. The game apparatus 1 of the user A and the game apparatus 1 of the user C store the integrated competition history information 11a in the respective storage units 11.

Figure 8:
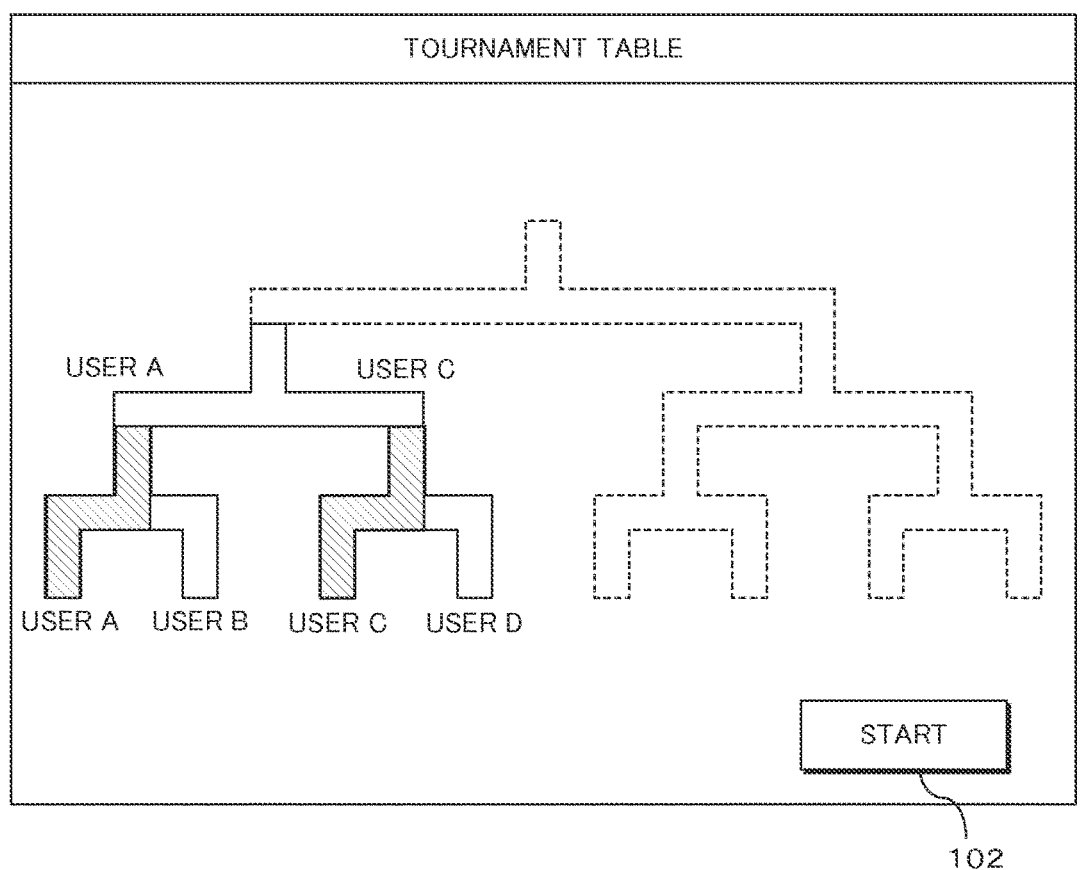
FIG. 8 shows an example non-limiting schematic view illustrating a display example of an updated tournament table.

After the competition history information 11a is integrated, the display processing unit 24 updates the tournament table displayed on the display unit 13 based on the integrated competition history information 11a. FIG. 8 shows an example non-limiting schematic view illustrating a display example of an updated tournament table. By exchanging and integrating the competition history information 11a for the user A with the competition history information 11a for the user C, a competition result of the first round for the user C is displayed in the tournament table for the game apparatus 1 of the user A, in addition to the competition result of the first round for the user A. That is, the tournament table shows that the user C competed against the user D in the first round and won. The tournament table also shows that the user A and user C will compete in the second round. In this stage, the remaining four users are undecided, and thus the portions related to the users are displayed with broken lines in the tournament table.

In this stage, a start button 102 is shown on the display screen of the tournament table. The user of the game apparatus 1 may perform operation for the start button 102 using the operation unit 14, to start a competition with the decided opponent. In the present example, by performing operation for the start button 102, the user A may start a competition against the user C.

Figure 9:
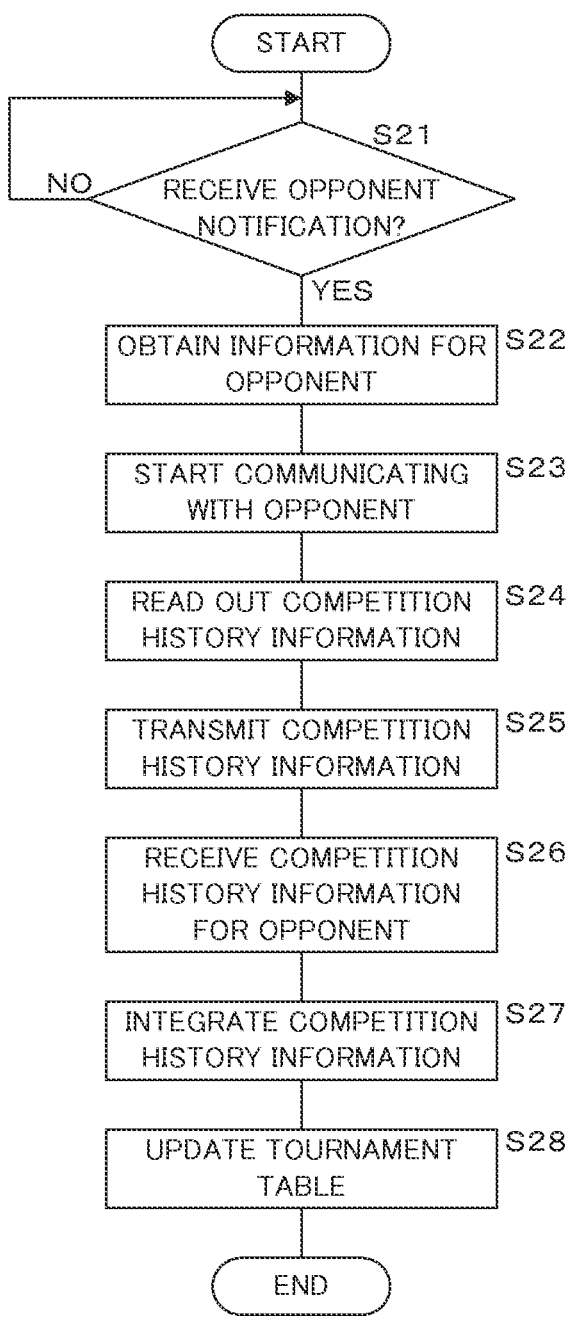
FIG. 9 shows an example non-limiting flowchart illustrating a procedure of integration processing for competition history information, performed by a game apparatus.

FIG. 9 shows an example non-limiting flowchart illustrating a procedure of integration processing for competition history information 11a, performed by the game apparatus 1. The processing unit 10 in the game apparatus 1 determines whether or not an opponent notification from the server 3 is received (step S21). If an opponent notification is not received (S21: NO), the processing unit 10 waits until an opponent notification is received. If an opponent notification is received (S21: YES), the history processing unit 23 in the processing unit 10 obtains information for an opponent included in the received opponent notification (step S22). The history processing unit 23 starts communicating with the game apparatus 1 used by the opponent user, based on the obtained information (step S23).

The history processing unit 23 reads out competition history information 11a stored in the storage unit 11 (step S24). The history processing unit 23 transmits the read-out competition history information 11a to the game apparatus 1 used by the opponent user (step S25). The history processing unit 23 receives competition history information 11a for the opponent transmitted from the game apparatus 1 used by the opponent user (step S26). The history processing unit 23 integrates the competition history information 11a for its own user stored in the storage unit 11 with the competition history information 11a for the opponent received from the game apparatus 1 used by the opponent user (step S27). Based on the integrated competition history information, the display processing unit 24 of the processing unit 10 updates a tournament table to be displayed on the display unit 13 (step S28) and terminates the processing.

If operation for the start button 102 shown in the updated tournament table is accepted, the game processing unit 21 of the game apparatus 1 communicates with the game apparatus 1 used by the opponent user decided by the server 3, to start the competition processing. Here, the game processing unit 21 performs various kinds of processing such as processing of generating a game screen and displaying it on the display unit 13, processing of accepting operation concerning a game by the user for the operation unit 14, processing of determining a game in accordance with the accepted operation, and processing of updating a game screen in accordance with the determination result. The game processing unit 21 transmits information such as game operation of the user accepted by the operation unit 14 or determination result of the game in response to the operation, to the game apparatus 1 used by the opponent user. The game processing unit 21 performs processing of receiving information such as game operation related to the opponent user or the determination result of the game, from the game apparatus 1 used by the opponent user. Based on the received information, the game processing unit 21 performs, for example, processing of updating a game screen.

As a result of game processing, in the case where win or loss of a competition is confirmed, the game processing unit 21 of each game apparatus 1 notifies the user of win or loss of the competition, while updating the competition history information 11a. That is, the game processing unit 21 performs processing of adding information related to the competition result to the competition history information 11a for its user stored in the storage unit 11. After the game processing unit 21 notifies the user of win or loss of the competition, the game apparatus 1 makes the display processing unit 24 display a tournament table.

Figure 10:
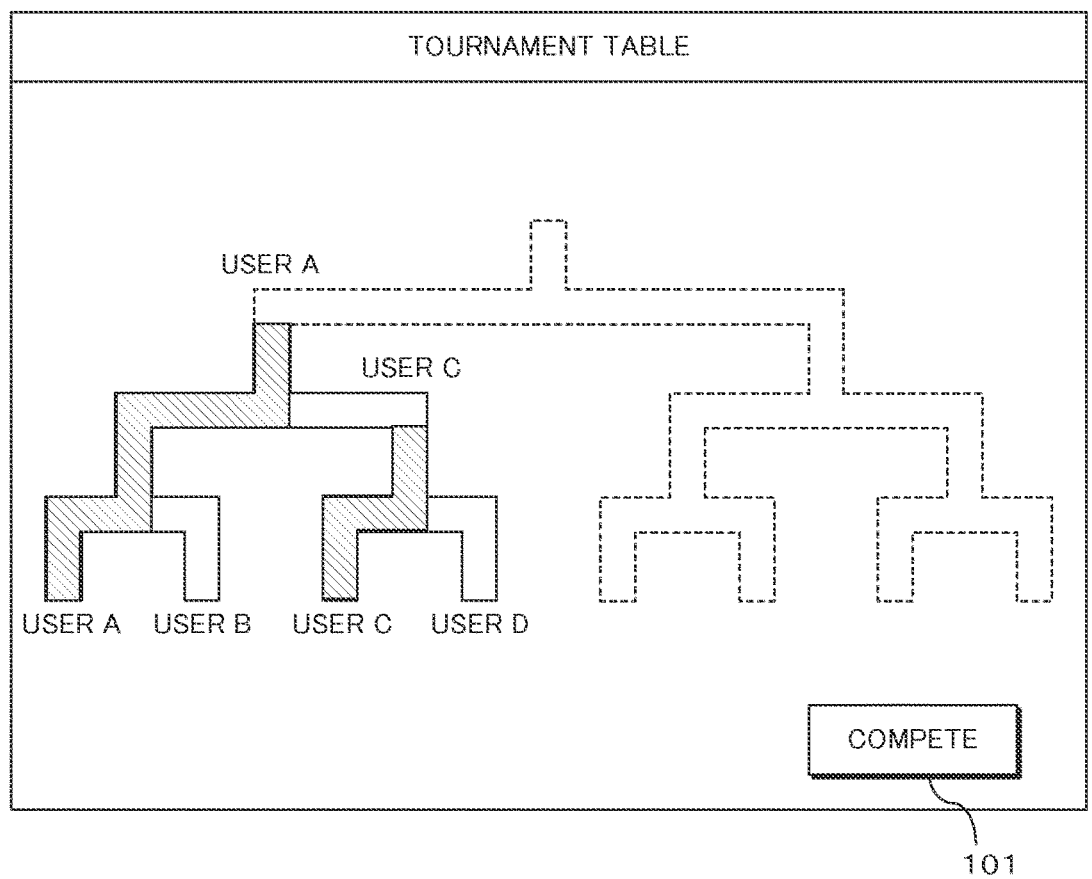
FIG. 10 shows an example non-limiting schematic view illustrating a display example of a tournament table after a competition.

FIG. 10 shows an example non-limiting schematic view illustrating a display example of a tournament table after a competition. It is assumed in the present example that the user A competed against the user C and the user A won. The tournament table in the game apparatus 1 of each of the users A and C indicates that the user A won the second round and proceeded to the final round. In the tournament table for the user A who won the competition, a compete button 101 for successively competing in the final round is shown as illustrated in FIG. 10.

In the tournament table for the user C who lost the competition, on the other hand, a button for retrying the tournament again from the first round and/or a button for retrying the tournament from the second round in which the user C lost are shown, for example (not illustrated). If the retry from the first round is selected, the game apparatus 1 of the user C may delete the competition history information 11*a* up to then and newly generate the competition history information 11*a* indicating that the user C has not yet competed in the first round, and store it in the storage unit 11. If the retry from the second round is selected, the game apparatus 1 of the user C may delete the information related to the user A from the competition history information 11*a*, and renew the competition history information 11*a* to indicate that the user C has not yet competed in the second round.

Figure 11:
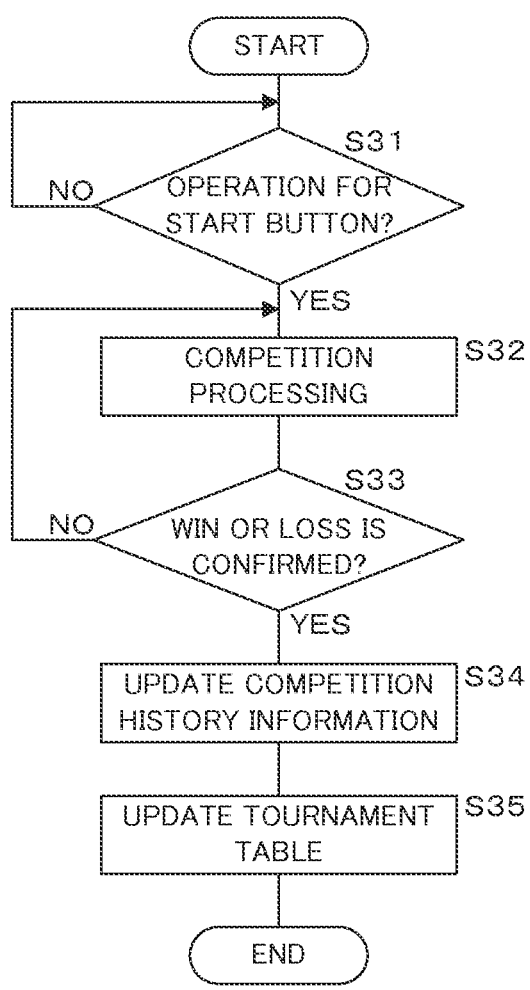
FIG. 11 shows an example non-limiting flowchart illustrating a procedure of processing related to a competition by a game apparatus.

FIG. 11 shows an example non-limiting flowchart illustrating a procedure of processing related to a competition by the game apparatus 1. The processing unit 10 in the game apparatus 1 determines whether or not operation for the start button 102 is performed in the display screen showing a tournament table (step S31). If operation for the start button 102 is not performed (S31: NO), the processing unit 10 waits until the operation for the start button 102 is performed. If operation for the start button 102 is performed (S31: YES), the game processing unit 21 of the processing unit 10 communicates with the game machine 1 used by an opponent user, and performs competition processing in a game against this opponent user (step S32). The game processing unit 21 determines whether or not win or loss of the competition is confirmed (step S33). If win or loss of the game is not confirmed (S33: NO), the game processing unit 21 returns the processing to step S32, and continuously performs competition processing until win or loss is confirmed.

If win or loss is confirmed (S33: YES), the history processing unit 23 of the processing unit 10 updates the competition history information 11*a* stored in the storage unit 11 so as to reflect the result of the competition (step S34). The display processing unit 24 of the processing unit 10 updates the tournament table to be displayed on the display unit 13 (step S35) based on the updated competition history information 11*a*, and terminates the processing.

After the second round is finished, the user A may, for example, compete in the final round of the tournament. The processing unit 10 in the game apparatus 1 which accepted the operation for the compete button 101 shown in the display screen of the tournament table illustrated in FIG. 10 makes a request for competing in the final round to the server 3. The server 3 decides an opponent in response to the competition request, and notifies the game apparatus 1 thereof. The game apparatus 1 notified of the opponent exchanges the competition history information 11*a* with the game apparatus 1 of the opponent, integrates the competition history information 11*a*, and displays a tournament table in which the competition results up to the final round are confirmed. Thereafter, competition processing is performed between the game apparatuses 1 to decide a champion, the competition history information 11*a* is updated for each game apparatus 1, and the tournament table is updated with the decided champion. These processing procedures are substantially the same as those in the second round as described above.

<Retry in the Same Round>

In the information processing system according to the present example embodiment, anytime in a period during which the tournament is being held, the user who lost the tournament may retry the first round match in the tournament as many times as desired. As for the user who retries the first round, the game apparatus 1 may discard his/her competition history information 11*a* related to the previous tournament. Alternatively, the game apparatus 1 may add and save the information indicating that the user has lost without discarding the competition history information 11*a* related to the previous tournament, and may newly create competition history information 11*a* related to the tournament to be retried by the user separately from the information on the previous tournament.

Furthermore, in the information processing system according to the present example embodiment, the user who lost the second or higher round in the tournament may retry the competition in the same round. In the information processing system according to the present example embodiment, however, a predetermined limit is imposed, not permitting unlimited number of retries in the same round match. For example, a predetermined number of retries, e.g., up to three retries, may be set as a limitation in the same round. In this case, information on, for example, the number of times the user retried or the remaining number of times the user is allowed to retry may be stored in the game apparatus 1 or in the server 3.

For example, the retry in the same round in which the user lost may require a payment whereas retry from the first round may be free of charge. In this case, the server 3 or a different server may perform processing of, for example, billing and managing the number of times the user is allowed to retry. For example, in the case where the details of a lost competition satisfies a predetermined condition, such as the case where the user is lost by a narrow margin or lost by a reversal, the user may be allowed to retry from the same round. In this case, determination on whether or not the user is allowed to retry from the same round may be made by each game apparatus 1.

In any case, when a lost user is allowed to retry from the same round, the processing unit 10 in the game apparatus 1 displays a button for retry on the display screen showing the tournament table after a competition. In the case where operation for this button is performed, the competition request unit 22 of the processing unit 10 transmits a competition request in the same round to the server 3. Regardless of whether the competition request from the game apparatus 1 is for the first time or for retry, the server 3 may accept the competition request as having the same content, decide an opponent, and notify the game apparatus 1, which transmitted the competition request, of its opponent. The server 3 may, however, change the condition for deciding an opponent in accordance with whether or not the competition request is related to a retry by, for example, giving priority to pair up retrying users as opponents.

In the information processing system, the user who won a competition by retrying may be distinguished from the user who won a competition without retrying in terms of treatment of the users. For example, in the system where a reward, point or the like is given to a winner, the given amount may be varied depending on whether or not the user won in a retry. For example, an image, animation or the like displayed by the game apparatus 1 after finishing a competition may be varied. Moreover, in the case where a difference in treatment is employed, such a difference may be increased or decreased in accordance with the number of retries.

The information processing system according to the present example embodiment may prevent the matching of opponents from being difficult due to the decreased number of users as the round is approaching to the final, by allowing the user to retry in the same round in a tournament.

<Change in Competition Condition>

In the information processing system according to the present example embodiment, the game apparatus 1 stores, in the storage unit 11, a win-loss record of a competition for the user in a game as win-loss record information 11b. In the win-loss record information 11b, information as described below are stored, for example. It is to be noted that the following information are mere examples. The win-loss record information 11b needs not contain all of the described information, or may contain information other than the ones described.

Number of times the user won the championships
Winning rate in the first round
Number of times the user proceeded to the second round
Winning rate in the second round
Number of times the user proceeded to the final round
Winning rate in the final round
Winning rate in all round matches
Maximum number of consecutive winnings
Number of consecutive winnings at present time point
Number of times the user lost in the first round
Number of consecutive losses at present time point The matching unit 42 of the server 3 may obtain the win-loss record information 11b to determine the ability of each user, and select an opponent so that the competing players have a small difference in their abilities. For example, the matching unit 42 may select users with substantially the same winning rates in all round matches as opponents. In the case where the matching of competing players is thus performed in consideration of user abilities, the game apparatus 1 may transmit the win-loss record information 11b when transmitting a competition request to the server 3, or the server 3 may store the win-loss record information 11b for each user.

In the information processing system according to the present example embodiment, processing of changing the condition for competition is performed in accordance with the win-loss record information 11b for two users who are to compete. That is, in the information processing system according to the present example embodiment, in the case where users with differences in their abilities compete, a handicap is set. The handicap may be set by the game processing unit 21 in each game apparatus 1. Hence, between two game apparatuses that are to compete, the win-loss record information 11b are exchanged when the competition history information 11a are exchanged. It may also be so configured that the server 3 stores the win-loss record information 11b together with the user information 31a. In such a configuration, the game apparatus 1 may be notified of the presence or absence of a handicap together with an opponent.

For the user who has won many championships, for example, the game processing unit 21 may set a condition advantageous for an opponent user of that user. For example, the game processing unit 21 may set an advantageous condition for a user who has consecutively lost the first round more than two times at the present time point. It is not necessary for the game processing unit 21 to set a handicap in the case where two competing users have, for example, won the championships for the same number of times or lost in the first rounds for the same number of times.

The game processing unit 21 may increase or decrease an ability value (parameter) such as moving speed or offensive power of a character operated by the user, for example, as a handicap. In this case, the game processing unit 21 may increase the ability value for a character to be provided with an advantageous condition, may decrease the ability value for a character to be provided with a disadvantageous condition, or may do both. For example, in a game for which win or loss is decided by obtaining scores, the game processing unit 21 may set a handicap by giving certain scores in advance to a user who is to be provided with an advantageous condition. For example, in a tennis game, a competition match may be started from the state where one user takes the first set. For example, the game processing unit 21 may set a handicap by giving in advance an item or the like which may be advantageous for the user to proceed in the game.

CONCLUSION

In the information processing system according to the present example embodiment, multiple game apparatuses 1 communicate with a server 3 through a network 99, allowing the user of a game apparatus 1 to compete in a tournament. The game apparatus 1 stores, in a storage unit 11, the history of competitions by users in a tournament as competition history information 11a. The competition request unit 22 in the game apparatus 1 transmits a competition request for requesting a competition match in a tournament to the server 3 based on operation of the user. The server 3 accepts a competition request from the game apparatus 1 at a competition request acceptance unit 41. The server 3 decides an opponent of the user concerning the accepted competition request at the matching unit 42, and notifies the game apparatus 1 of the opponent decided at the opponent notification unit 43.

The game apparatus 1 which received the notification for an opponent from the server 3 communicates with the game apparatus 1 used by the opponent user, to exchange competition history information 11a. The history processing unit 23 of the game apparatus 1 performs processing of integrating its own competition history information 11a stored in the storage unit 11 and the competition history information 11a obtained by the exchange from the game apparatus 1 of the opponent. Thereafter, the game apparatus 1 performs processing by the game processing unit 21 through communication with the game apparatus 1 of the opponent user, and updates the competition history information 11a by the history processing unit 23 based on a competition result.

With the configuration as described above, in the information processing system according to the present example embodiment, each user who utilizes the game apparatus 1 may take in information related to past opponents or competition results of other users whom the user competed against in a tournament, into its competition history information 11a. This allows each user to know about participants who have not directly competed with the user in a tournament. The game apparatus 1 may display the entire tournament table based on the integrated competition history information 11a. Therefore, the information processing system according to the present example embodiment may realize a virtual tournament competition in a manner close to the reality.

In the information processing system according to the present example embodiment, the competition request unit 22 in the game apparatus 1 transmits the competition history information 11a stored in the storage unit 11 to the server 3 when the competition request unit 22 of the game apparatus 1 transmits a competition request to the server 3. The competition history information 11*a* contains information related to an opponent whom the user has previously competed against and also to an opponent whom this opponent user has previously competed against. The matching unit 42 in the server 3 decides an opponent based on the competition history information 11*a* received from the game apparatus 1. The matching unit 42 selects users who proceeded to the same round match as opponents. The matching unit 42 decides an opponent such that no duplicate user is included in the competition history information for two competing users. Accordingly, in the information processing system according to the present example embodiment, competition in a tournament matches may be realized in a manner close to the reality without the possibility of one user entering multiple places in a tournament table.

In the information processing system according to the present example embodiment, the display processing unit 24 of the game apparatus 1 performs processing of displaying the entire tournament table on the display unit 13 based on the competition history information 11*a* stored in the storage unit 11. The display processing unit 24 displays, for example, a part confirmed in a tournament table with a solid line and displays an unconfirmed part with a broken line, so as to distinguish the confirmed part with the unconfirmed part. The display of the entire tournament table allows the user to easily grasp the progress status of the tournament.

In the information processing system according to the present example embodiment, the user who loses the second or higher round in the tournament may retry the same round. In the case where the user who lost requests a retry in the same round, the competition request unit 22 in the game apparatus 1 transmits a competition request in the same round to the server 3, which accepts the competition request to decide an opponent. In this case, the information processing system sets a certain degree of limitations, not accepting unlimited number of tries in the same round. In the information processing system according to the present example embodiment, therefore, the user may be provided with an opportunity to retry and may thus have a higher possibility to experience a victory in a tournament championship. By setting a certain degree of limitations for retries, it is possible to prevent a game from being less enjoyable due to excessive lowering in its difficulty level, for example.

In the information processing system according to the present example embodiment, the game apparatus 1 stores the win-loss record information 11*b* for the user in the storage unit 11. The game apparatus 1 exchanges the win-loss record information 11*b* with the game apparatus 1 used by the opponent user. The game processing unit 21 in the game apparatus 1 changes a condition of a competition based on these win-loss record information 11*b*. Accordingly, the information processing system may set a handicap in a competition by users in accordance with the ability of each of the users.

While a case has been described where the users compete one to one in the present example embodiment, the present technology is not limited thereto. The information processing system may be so configured that two-to-two or many-to-many matches are performed, for example. Though the case where one user utilizes one game apparatus 1 was described, the present technology is not limited thereto. Two or more users may share one game apparatus 1, in which the game apparatus 1 may store the competition history information 11*a* for each user in the storage unit 11.

While an example of a tournament with eight users has been described in the present example embodiment, the present technology is not limited thereto. The information processing system may also be configured that less than or more than eight users compete in a tournament. In the tournament, a so-called seed system may be employed, which allows a user to skip the first round to proceed to the second or higher round. In this case, a seed may be given to a user who had won the championship, for example, or to a user who had lost the first rounds many times, or the seed may be sold for a fee, or the seed may be given under a condition other than these. In the present example embodiment, the display screens of the tournament tables illustrated in FIGS. 5, 8 and 10 are illustrated by way of examples and not by way of limitation.

While the present example embodiment described that the competition history information 11*a* is transmitted from the game apparatus 1 to the server 3, which decides an opponent based on the competition history information 11*a*, the configuration is not limited thereto. The information processing system may be so configured that the game apparatus 1 transmits a part of the competition history information 11*a* to the server 3 and the server 3 decides an opponent based on the part of the information received by the server 3. For example, the game apparatus 1 may only transmit information indicating up to which round the user has proceeded, to the server 3. In this case, the server 3 may be configured to decide an opponent without considering duplication or the like.

While the present example embodiment described the game apparatus 1 as an example of an information processing apparatus, the present technology is not limited thereto. For example, a similar technique may be applicable to various information processing apparatuses such as a general-purpose computer, a tablet terminal device or a mobile phone. The processing procedures for the game apparatus 1 and server 3 illustrated in the present example embodiment are mere examples, but are not limited thereto. The device configuration of the information processing system as well as the assignment of functions in each device are not limited to the ones described in the present example embodiment. For example, at least a part of the functions described as those of the game apparatus 1 in the present example embodiment may be held by the server 3. On the contrary, at least a part of the functions described as those of the server 3 may be held by the game apparatus 1. The functions of the server 3 may be shared by multiple servers. The game apparatus 1 may also be configured to display an image on an external display device, instead of being provided with a display unit 13.

(Modification)

While the competition history information 11*a* for the user is stored in the game apparatus 1 in the embodiment described above, the configuration is not limited thereto. In the information processing system according to a modification, the server 3 stores the competition history information 11*a* for the user. The game apparatus 1 transmits a competition request to the server 3 based on the operation of the user. The server 3 which received the competition request decides an opponent while reading out and integrating the competition history information 11*a* for two competing users. The server 3 transmits a notification for an opponent to the game apparatus 1, while transmitting the integrated competition history information 11*a* to the game apparatus 1. The game apparatus 1 displays a tournament table based on the received competition history information 11*a*.

Subsequently, two game apparatuses 1 communicate with each other to perform competition processing in a game. It is to be noted that the game apparatus 1 may directly communicate with another game apparatus 1 or may communicate through the server 3. In the configuration where the game apparatuses 1 directly communicate with each other, when win or loss of a competition is confirmed, the game apparatus 1 notifies the server 3 of a competition result. The server 3 updates the competition history information 11a for each user in accordance with the competition result.

As described in the modification above, the information processing system may be so configured that the competition history information 11a for the user is stored in the server 3. Furthermore, the information processing system may also be configured to include a server for storing the competition history information 11a, separately from the server 3 which, for example, decides an opponent.

It is to be understood that elements and the like in a singular form preceded by an article "a" or "an" do not exclude more than one elements related thereto when used in the present specification.

The present technology herein may realize a virtual tournament competitions in a manner close to the reality.

What is claimed is:

1. An information processing system in which a server communicates with a plurality of information processing apparatuses via a network, and a plurality of users of the information processing apparatuses competes in a tournament,
    the server configured to:
    accept a competition request from an information processing apparatus associated with a first user, the competition request including at least a part of competition history information for the first user participating in the tournament including a plurality of rounds, the competition history information including information about other users who competed with the first user in one or more completed rounds of the tournament; and
    based on at least a part of the competition history information included in the request, decide an opponent for a next round of the tournament,
    the information processing apparatus comprises one or more processors configured to:
    store, in storage, the competition history information for the first user;
    transmit the competition request to the server;
    responsive to the competition request, receive from the server information related to the opponent decided by the server for the next round of the tournament;
    transmit at least a part of the stored competition history information to another information processing apparatus associated with the opponent decided by the server;
    receive, from the other information processing apparatus, at least a part of competition history information associated with the opponent decided by the server; and
    perform processing concerning the next round of the competition against the opponent decided by the server.

2. The information processing system according to claim 1, wherein the information processing apparatus is further configured to:
    integrate competition history information of the first user with competition history information received from the other information processing apparatus.

3. The information processing system according to claim 2, wherein the information processing apparatus is further configured to:
    update the competition history information for the first user based on a processing result of the next round of the competition against the opponent, and store the updated competition history information in the storage.

4. The information processing system according to claim 1, wherein
    each information processing apparatus stores competition history information for a user who uses the information processing apparatus.

5. The information processing system according to claim 1, wherein
    the competition request includes information for the server to determine how many rounds of the competition the first user has won.

6. The information processing system according to claim 5, wherein
    the server decides the opponent who has completed the same rounds of the competition as the first user.

7. The information processing system according to claim 1, wherein
    the server decides an opponent for the first user such that a competition is not performed with a duplicate user who participates in a current tournament, contained in the competition history information of the first user.

8. The information processing system according to claim 1, wherein
    the opponent is decided such that no duplicate user is included in the competition history information for the first user and the competition history information for the opponent.

9. The information processing system according to claim 1, wherein
    the competition history information contains information related to a progress status of the first user in the tournament, and
    the opponent is decided based on information related to the progress status.

10. The information processing system according to claim 1, wherein
    the opponent is decided so that the opponent has proceeded to a same round in the tournament as the first player.

11. The information processing system according to claim 1, wherein
    the competition history information associated with the opponent contains information related to a user who has previously competed with the opponent in the tournament and who has not previously competed with the first user.

12. The information processing system according to claim 1, wherein
    the competition processing is performed after transmitting at least a part of the stored competition history information to the other information processing apparatus and receiving at least a part of the competition history information from the other information processing apparatus.

13. The information processing system according to claim 1, wherein
    the one or more processors in the information processing apparatus are further configured to display an entire tournament table on a display unit based on the competition history information stored in the storage and at least a part of the competition history information received from the other information processing apparatus.

14. The information processing system according to claim 13, wherein
the one or more processors are configured to update the tournament table in accordance with a progress status of the tournament.

15. The information processing system according to claim 1, wherein
the server is configured to accept a request for retry in a same round in a tournament from a user who lost in competition processing.

16. The information processing system according to claim 1, the one or more processors are configured to store win-loss record information of the first user, wherein
a competition condition in the processing concerning the next round of the competition against the opponent is changed based on the stored win-loss record information of the first user and win-loss record information of the opponent.

17. An information processing apparatus comprising:
storage configured to store competition history information for a first user in a tournament including a plurality of rounds, the competition history information including information about other users who competed with the first user in one or more completed rounds of the tournament;
processing system including at least one processor and memory, the processing system configured to at least:
transmit at least a part of competition history information stored in the storage to a server together with a competition request;
responsive to the request, receive from the server information related to an opponent for a next round of the tournament;
transmit at least a part of the competition history information stored in the storage to another information processing apparatus associated with the opponent decided by the server based on at least a part of the transmitted competition history information and the transmitted competition request;
receive, from the another information processing apparatus, at least a part of competition history information associated with the opponent decided by the server; and
perform processing concerning the next round of the competition against the opponent decided by the server.

18. The information processing apparatus of claim 17, wherein the competition history information associated with the opponent includes information about other users who competed with the opponent in one or more completed rounds of the tournament.

19. The information processing apparatus of claim 17, wherein the processing system is configured to, for each round of the tournament transmit a competition request to the server with at least a portion of the stored competition history information, at least one of the requests including at least a portion of competition history information received from another information processing apparatus.

20. The information processing apparatus of claim 17, wherein the competition request transmitted to the server with at least a part of the competition history information stored in storage is transmitted upon rejoining the tournament in which the first user previously participated.

21. A non-transitory recording medium in which a computer program is recorded, when executed, causes a computer to at least:
store competition history information for a first user in a tournament including a plurality of rounds, the competition history information including information about other users who competed with the first user in one or more completed rounds of the tournament;
transmit at least a part of the stored competition history information to a server together with a competition request;
responsive to the request, receive from the server information related to an opponent for a next round of the tournament;
transmit at least a part of the stored competition history information to an information processing apparatus associated with the opponent decided by the server based on at least a part of the transmitted competition history information and the transmitted competition request;
receive, from the information processing apparatus associated with the opponent decided by the server, at least a part of competition history information associated with the opponent decided by the server; and
perform processing concerning the next round of the competition against the opponent decided by the server.

22. An information processing method in which a server communicates with a plurality of information processing apparatuses via a network and a plurality of users of the information processing apparatuses, comprising:
storing competition history information for a first user in a tournament including a plurality of rounds, the competition history information including information about other users who competed with the first user in one or more completed rounds of the tournament;
accepting, by the server, a competition request from an information processing apparatus associated with the first user, the competition request including at least a part of competition history information for the first user;
based on at least a part of the competition history information included in the request, deciding, by the server, an opponent for a next round of the tournament;
transmit at least a part of the stored competition history information to another information processing apparatus associated with the opponent decided by the server;
receiving, from the other information processing apparatus, at least a part of competition history information associated with the opponent decided by the server; and
performing processing concerning the next round of the competition against the opponent decided by the server.

23. The information processing apparatus of claim 17, wherein the competition history information of the first user is directly transmitted to the other information processing apparatus, and the competition history information associated with the opponent is directly received from the other information processing apparatus.

* * * * *